United States Patent [19]
Aichenegg et al.

[11] 3,726,884
[45] Apr. 10, 1973

[54] CARBALKOXYALKANE SULFINIC ACID HALIDES AND ESTERS

[75] Inventors: Paul C. Aichenegg, Shawnee Mission, Kans.; Richard A. Thornhill, Kansas City, Mo.

[73] Assignee: Chemagro Corporation, Kansas City, Mo.

[22] Filed: Sept. 8, 1970

[21] Appl. No.: 70,463

[52] U.S. Cl..................260/481 R, 71/103, 260/470, 424/308, 424/311
[51] Int. Cl..............................................C07c 145/00
[58] Field of Search.................................260/481 R

[56] References Cited

OTHER PUBLICATIONS

Boehme et al., Chem. Abst. 72 66,342f.

*Primary Examiner*—Henry R. Jiles
*Assistant Examiner*—John F. Terapane
*Attorney*—Burgess, Dinklage & Sprung

[57] ABSTRACT

Carbalkoxyalkane sulfinic acid halides and esters, e.g., 1-carbo-lower alkoxy-lower-1-alkane-1-sulfinic acid chlorides or bromides or sulfinic or thiosulfinic acid esters of hydrocarbon alcohols, haloalkyldithioalkyl alcohols or haloaryl alcohols which are useful as plant growth-regulating agents and as herbicidally and fungicidally active agents, as well as intermediates therefor.

12 Claims, No Drawings

CARBALKOXYALKANE SULFINIC ACID HALIDES AND ESTERS

The present invention relates to and has for its objects the provision of particular new carbalkoxyalkane sulfinic acid halides and their conversion to esters of the corresponding sulfinic or thiosulfinic acid with hydrocarbon alcohols, haloalkyldithioalkyl alcohols or haloaryl alcohols and the respective thioalcohols, which esters are useful as plant growth-regulating agents as well as herbicidally and fungicidally active agents. The invention also extends to compositions in the form of mixtures of such esters with solid and liquid dispersible carrier vehicles, and methods for producing such chlorides and esters.

It is not believed that any sulfinyl halides or esters of analogous constitution are known and/or are known to be useful to make compounds which possess fungicidal, herbicidal and growth-regulating properties.

It has now been found, in accordance with the present invention, that the particular new sulfinic acid derivatives of the general formula

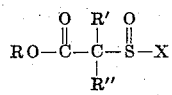
(I)

in which
R is lower alkyl,
R' and R'' are each lower alkyl or hydrogen,
X is chlorine, bromine or Y-R''',
Y is oxygen or sulfur, and
R''' is hydrocarbon, haloalkyldithioalkyl or haloaryl, exhibit strong fungicidal, herbicidal and growth-regulating properties or are useful as intermediates for compounds having such properties.

Furthermore, it has been found, in accordance with the present invention, that the compounds of Formula I above wherein X is chlorine or bromine may be produced by a process which comprises reacting a symmetric carboxylic acid ester disulfide of the formula

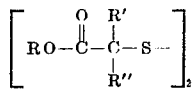
(II)

in which R' and R'' are the same as defined above, with chlorine or bromine in the presence of acetic anhydride according to the method described by I. Douglass, J.O.C. 33, 2,105, 1968. Compounds wherein X is — YR''' can be produced therefrom by reaction with an appropriate alcohol or mercaptan.

The sulfinic acid esters and halides of the instant invention are chemically completely novel compounds unobvious over the prior art. Because of the usefulness of the esters as growth-regulating, fungicidal and herbicidal agents and their broad spectrum of activity, the instant compounds therefore represent a valuable enrichment of the art.

According to the reaction if, for instance, methoxy carbonyl methyl disulfide is used as starting material, the course of the reaction can be represented by the following equation:

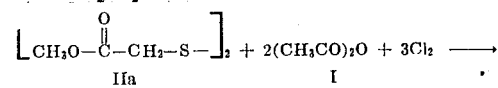

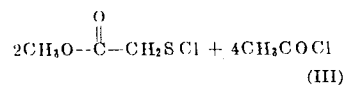
(III)

Advantageously, in accordance with the present invention, in the various formulas herein,
R represents
lower alkyl hydrocarbon of one to four carbon atoms, such as methyl, ethyl, n-propyl, isopropyl, n-butyl, isobutyl, sec.-butyl, tert.-butyl, and the like, especially $C_{1-3}$ alkyl, and more especially methyl and ethyl;
R' and R'' each individually represents
methyl or hydrogen,
X represents chlorine, and
R''' represents lower alkyl or lower alkenyl especially of one to four carbon atoms, cyclohexyl, benzyl, phenyl or tolyl, halo-lower alkyl-dithio-lower alkyl such as trihaloethyldithioethyl, or haloaryl.

The preferred compounds include:

1. Methoxycarbonyl methane sulfinyl chloride (or carbomethoxy methane sulfinyl chloride),
2. Ethoxycarbonyl methane sulfinyl chloride,
5. 1-Ethoxycarbonyl ethane-1-sulfinyl chloride,
6. 1-propoxycarbonyl ethane-1-sulfinyl chloride
9. 2-Methoxycarbonyl propane-2-sulfinyl chloride,
10. 2-Ethoxycarbonyl propane-2-sulfinyl chloride,
3. n-Propoxycarbonyl methane sulfinyl chloride,
4. 1-Methoxycarbonyl ethane-1-sulfinyl chloride,
7. 1-Isopropoxycarbonyl ethane-1-sulfinyl chloride, and
8. 1-butoxycarbonyl ethane-1-sulfinyl chloride.

The types of symmetric carboxylic acid ester disulfides usable as starting materials in accordance with the process of the present invention are clearly characterized by Formula III noted above.

These symmetric carboxylic acid ester disulfides are well known and can be prepared on an industrial scale.

As examples of such symmetric carboxylic acid ester disulfides which can be used as starting materials for the process according to the present invention, there may be mentioned in particular:

IIa. Carbomethoxymethyl disulfide,
IIb. Carbethoxymethyl disulfide,
IIc. Carbopropoxymethyl disulfide,
IId. 1-Carbomethoxyethyl-1-disulfide,
IIe. 1-Carbethoxyethyl-1-disulfide,
IIf. 1-Carbopropoxyethyl-1-disulfide,
IIg. 1-Carbisopropoxyethyl-1-disulfide,
IIh. 1-Carbobutoxyethyl-1-disulfide,
IIi. 2-Carbomethoxypropyl-2-disulfide,
IIj. 2-Carbethoxypropyl-2-disulfide.

These symmetric ester disulfides may be prepared (Method A) by reacting the corresponding alpha bromo carboxylic esters with sodium disulfide (freshly prepared) in ethyl alcohol under anhydrous conditions followed by recovery of the excess alcohol and formed sodium bromide by vacuum stripping and washing of the obtained residue with water.

Another mode of preparation (Method $B_1$) of these starting symmetric ester disulfides that can be used with advantage for the process involves esterification of the corresponding symmetric carboxylic acid disulfides according to the method by Harrison, H. R. et al, Fieser and Fieser "Reagents for Organic Synthesis", 1967, p. 705, using p-toluene sulfonic acid catalyst and molecular sieve to effect the formation of the ester from the alcohol and the free bis-acid.

Yet another method of preparation (Method $B_2$) of the symmetric ester disulfides consists of converting the corresponding symmetric carboxylic acid disulfides to the acid chlorides, which in turn yield the desired bis esters by direct reaction with the corresponding free alcohols.

As starting materials for the symmetric carboxylic acid disulfides used in preparation methods $B_1$ and $B_2$ above, there can be used mercapto carboxylic acids which may be oxidized by well-known methods to yield the corresponding desired disulfides.

As examples of such mercapto carboxylic acids, there may be mentioned in particular
thioglycolic acid
thiolactic acid and
alpha mercapto isobutyric acid.

In addition to the reagents employed, the reaction according to the process to make the instant alkoxycarbonylalkane sulfinyl chlorides as described by Douglass (loc. cit.), may be carried out optionally in the presence of an inert organic solvent which term also includes a mere diluent. Examples of such solvents include chlorinated hydrocarbons such as methylene chloride, dichloroethane, chloroform, carbon tetrachloride and the like; but the preferred solvents are chloroform or carbon tetrachloride.

The reaction temperature for the above process can be varied within a moderately wide range. In general, the reaction is carried out at substantially between about $-40$ and $+10°$ C., preferably between about $-30$ and $0°$ C.

In general and for reasons stated in Douglass (loc.cit.), for the process, the reactants are used in equimolar proportions. A slight excess of the acetic anhydride reactant may be used with less disadvantage as compared to an excess used of the disulfide. Any formed sulfonyl chloride remains as residue after vacuum distillation of the sulfinyl chloride product and can thus be removed.

It has furthermore been found, in accordance with the present invention, that the compounds of Formula II as derivatives of the compounds of formula I may be produced by a process which comprises reacting the appropriate alcohol, phenol, mercaptan or thiophenol in an equimolar ratio with a compound having formula I. Examples of such alcohols, phenols, mercaptans and thiophenols are methyl alcohol, ethyl alcohol, propyl alcohol, isopropyl alcohol, allyl alcohol, butyl alcohol, amyl alcohol, 2-chloroethyl alcohol, 3-chloropropyl alcohol, 2,2-dichloroethyl alcohol, 1,2,2,-tricholoroethyl dithioethanol, benzyl alcohol, phenol, o-cresol, p-chlorophenol, 4-nitrophenol, 2,4-dichlorophenol, cyclohexanol, methyl mercaptan, ethyl mercaptan, isopropyl mercaptan, allyl mercaptan, butyl mercaptan, hexyl mercaptan, lauryl mercaptan, cyclohexyl mercaptan, thiophenol, p-thiocresol, p-chlorothiophenol, p-nitrothiophenol, o-chlorothiophenol, benzylmercaptan, p-methyl thiophenol, and the like.

Examples within formula II are:

p-chlorophenyl carbomethoxymethane thiosulfinate,
phenyl carbethoxymethane thiosulfinate,
isopropyl 1-carbethoxyethane-1-sulfinate,
1,2,2-trichloroethyldithioethyl 1-carbisopropoxyethane-1-sulfinate,
p-chlorophenyl 2-carbomethoxypropane-2-thiosulfinate,
ethyl carbomethoxymethane thiosulfinate,
ethyl 1-carbethoxyethane-1-thiosulfinate,
p-tolyl 1-carbethoxyethane-1-thiosulfinate,
2,4-dichlorophenyl 1-carbethoxyethane-1-sulfinate,
allyl 1-carbethoxyethane-1-sulfinate,
benzyl 1-carbethoxyethane-1-thiosulfinate,
benzyl carbethoxymethane thiosulfinate,
ethyl carbopropoxymethane thiosulfinate,
ethyl 1-carbomethoxyethane-1-thiosulfinate,
1,2,2-trichloroethyldithioethyl 1-carbethoxyethane-1-sulfinate,
ethyl 1-carbopropoxyethane-1-thiosulfinate,
ethyl 1-carbobutoxyethane-1-thiosulfinate,
1,2,2-trichloroethyldithioethyl 2-carbethoxypropane-2-sulfinate,
isopropyl carbethoxymethane thiosulfinate,
tertiary-butyl carbethoxymethane thiosulfinate,
allyl carbethoxymethane thiosulfinate,
allyl carbethoxymethane sulfinate,
cyclohexyl carbethoxymethane thiosulfinate,
2,4-dichlorophenyl carbethoxymethane sulfinate,
phenyl carbethoxymethane thiosulfinate,
p-chlorophenyl carbethoxymethane sulfinate,
ethyl carbopropoxymethane sulfinate,
allyl carbopropoxymethane thiosulfinate,
cyclohexyl carbopropoxymethane thiosulfinate,
phenyl 1-carbomethoxyethane-1-thiosulfinate,
cyclohexyl 1-carbomethoxyethane-1-thiosulfinate,
methyl 1-carbethoxyethane-1-thiosulfinate,
isopropyl 1-carbethoxyethane-1-sulfinate,
tertiary-butyl 1-carbethoxyethane-1-thiosulfinate,
allyl 1-carboisopropoxyethane-1-sulfinate,
benzyl 1-carbobutoxyethane-1-thiosulfinate,
cyclohexyl 1-carbobutoxyethane-1-sulfinate,
p-chlorophenyl 1-carbopropoxyethane-1-sulfinate,
p-tolyl 1-carboisopropoxyethane-1-thiosulfinate,
methyl 2-carbethoxypropane-2-thiosulfinate,
isopropyl 2-carbethoxypropane-2-sulfinate,
allyl 2-carbopropoxypropane-2-thiosulfinate,
tertiary-butyl 2-carbobutoxypropane-2-sulfinate,
2,4-dichlorophenyl 2-carbopropoxypropane-2-thiosulfinate,
benzyl 2-carbomethoxypropane-2-thiosulfinate, and the like.

Advantageously, the active derivative compounds of the instant sulfinyl chlorides, according to the present invention, exhibit strong growth regulatory, fungicidal and herbicidal properties with comparatively low toxicity to warm-blooded creatures and concomitantly low phytotoxicity. Hence, the instant compounds are suitable for use as plant regulatory and plant protection agents. As to the growth-regulating properties, the derivative of the compounds of the instant invention exhibit remarkable growth regulatory action when applied to plants, bulbs, seeds, and other forms of plant life.

Furthermore, the present invention contemplates methods of regulating the growth of plants, e.g., for stunting or retarding the growth of monocotyledenous and dicotyledenous crop and weed plants, ornamental plants, shrubs and trees; and for retarding the growth of grasses such as Kentucky Blue Grass, fescue, and the like, by reducing both the clipping weight per unit area and the plant height, and thus providing a means of chemical mowing; and for inhibiting or partially inhibiting the underside growth of suckers on plants, for example, tobacco plants and the like.

As to the fungicidal properties, the derivatives of the instant compounds possess a broad spectrum of activity.

Thus, the derivatives of the instant compounds can be used for control of fungi from the most widely different classes of fungi, such as for example Archimycetes, Phycomycetes, Ascomycetes, Basidiomycetes, *Fungi Imperfecti*, and the like. The instant compounds can give particularly effective results against parasitic fungi on above-ground parts of plants, fungi causing tracheomycosis, which attack the plant from the soil, seed-borne fungi, and soil-borne fungi, such as the organism *Ceratocystis ulmi, Colletotrichum obiculare, Fusarium lycopersici, Fusarium nivale, Helminthosporium sativum, Rhizoctonia solani, Verticillium alboatrum*, Pythium, Alternaria, Ustilago, and the like.

The derivatives of the substances according to the invention exhibit herbicidal properties and can therefore be used as weed killers. The term weeds in the widest sense comprises all plants which grow in places where they are undesirable.

Whether the derivatives of the substances according to the invention act as total or as selective herbicides depends essentially upon the amount applied.

The derivatives of the substances according to the invention can be applied, for example, to the following plants: Dicotyledons, such as mustard (Sinapis), cress (Lepidium), cleavers (Galium), chickweed (Stellaria), camomile (Matricaria), French weed (Galinsoga), goose-foot (Chenopodium), stinging nettle (Urtica), groundsel (Senecio), cotton (Gossypium), beet (Beta), carrots (Daucus), beans (Phaseolus), potatoes (Solanum), coffee (Coffea); monocotyledons, such as cat's tail (Phleum), meadow grass (Poa), fescue grass (Festuca), Eleusine, bristle-grass (Seteria), rye-grass (Lolium), brome grass (Bromus), chicken millet (Echinochloa), wheat (Triticum), millet (Panicum), cane sugar (Saccharum), maize (Zea), rice (Oryza), oats (Avena), and barley (Hordeum).

The plant species indicated in this enumeration are representative examples of the genus given in Latin. However, the use of the derivatives of the substances according to the invention is in no way limited to these genera but applies to other plants in the same manner.

The active compounds according to the instant invention can be utilized, if desired, in the form of the usual formulations or compositions with conventional inert pesticide diluents or extenders, i.e., conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: Inert dispersible liquid diluent carriers including inert organic solvents, such as aromatic hydrocarbons (e.g., benzene, toluene, xylene, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, alumina, silica, chalk, i.e., calcium carbonate, talc, kieselguhr, etc.) and ground synthetic minerals (e.g., highly dispersed silicic acid, silicates, e.g., alkali silicates, etc.); wherein the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc. and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, insecticides or nematocides, or herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent, and preferably 0.5–90 percent, by weight of the mixture, whereas carrier composition mixtures suitable for direct application or field application generally contemplate those in which the active compound is present in an amount substantially between about 0.0001–2.0 percent, preferably 0.01–0.8 percent, by weight of the mixture. Thus, the present invention contemplates overall compositions which comprise mixtures of a conventional dispersible carrier vehicle such as (1) a dispersible inert finely divided carrier solid and/or (2) a dispersible carrier liquid such as an inert organic solvent and/or water preferably including a surface-active effective amount of a carrier vehicle assistant, e.g., surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well-known ultra-low-volume process with good success, i.e., by applying such compound if normally a liquid, or by applying a liquid composition containing the same, via very effective atomizing equipment in finely divided form, e.g., average particle diameter of from 50–$\phi$microns, or even less, i.e., mist form, for example, by airplane crop spraying techniques. Only up to at most about a few liters/hectare are needed, and often amounts only up to about 1 quart/acre, preferably 2–16 fluid ounces/acre, are sufficient. In this process, it is possible to use highly concentrated liquid compositions with said liquid carrier vehicles containing from about 20 to about 95 percent by weight of the active compound, or even the 100 percent active substance alone, e.g., about 20–100 percent by weight of the active compound.

Furthermore, the present invention contemplates methods of selectively killing, controlling or combating pests, i.e., fungi, weeds and plant growth, which comprise applying to at least one of (a) such fungi, (b) such weeds, (c) such plants, and (d) the corresponding habitat, i.e., the locus to be protected, a correspondingly pesticidally toxic amount, i.e., a fungicidally, herbicidally and/or growth regulatory effective amount, of the particular active compound of the invention alone or together with a carrier vehicle as noted above. The instant formulations or compositions are applied in the usual manner, for instance, by spraying, atomizing, vaporizing, scattering, dusting, watering, sprinkling, pouring, and the like.

It will be realized, of course, that the concentration of the particular active compound utilized in admixture with the carrier vehicle will depend upon the intended application, and may be varied within a fairly wide range, depending upon the weather conditions, the purpose for which the active compound is used, and the type locus to be treated. Therefore, in special cases, it is possible to go above or below the aforementioned concentration ranges.

In commercial practice, the compositions when used as fungicides and herbicides according to the present invention are usually applied to the soil infested with fungi and weeds.

The outstanding growth regulator, fungicidal and herbicidal activity of the particular active compounds of the present invention is illustrated, without limitation, by the following examples.

EXAMPLE 1

Cucumber Root Growth Test

Wettable powder base consisting of:

92 parts by weight hydrated silica (ultra fine, "Hi-Sil 233")

4 parts by weight sodium lignin sulfonate ("Marasperse N")

4 parts by weight polycondensate of ethylene oxide, propylene oxide and propylene glycol (mol. wt. about 1,000) ("Pluronic L-51")

To produce a suitable preparation of the particular active compound, 1 part by weight of such active compound is mixed intimately with 1 part by weight of the stated wettable powder base, and the resulting mixture is diluted with water to the desired final concentration. A piece of round filter paper (150 mm. diameter) is placed in a 150 mm. × 25 mm. Petri dish, and 10 cucumber seeds are arranged in a row on the paper. The filter paper is then moistened with 7 mls. of the preparation of the given active compound.

The so-treated dish is incubated in darkness at 22° C. Rating is determined on the basis of growth response as expressed in length of the root during the period of 24 hours between the third and fourth day of incubation.

A "0" to "9" scale rating is used to indicate the activity of potential growth retardants. A "0" scale reading indicates growth retardation within the range of 0–10 percent as compared with the control. A "9" scale reading corresponds to 90 percent or more growth retardation. On the other hand, figures in parenthesis indicate growth promotion or enhancement. Thus, a (0) to (9) scale rating is used to indicate the activity of potential growth promotants. (0) indicates growth promotion within the range of 0–10 percent as compared with the control, whereas (9) indicates 90 percent or greater growth promotion when compared with the control.

The particular active compounds tested, the amounts used and the results obtained can be seen from the following Table 1.

TABLE 1

| Example number | Active compound | Concentration (p.p.m.) | | |
|---|---|---|---|---|
| | | 10,000 | 1,000 | 100 |
| 25 | $CH_3O-\overset{O}{\underset{\|}{C}}-CH_2-\overset{O}{\underset{\|}{S}}-S-\langle\bigcirc\rangle-Cl$ | 9 | 8 | 0 |
| 26 | $C_2H_5O-\overset{O}{\underset{\|}{C}}-CH_2-\overset{O}{\underset{\|}{S}}-S-\langle\bigcirc\rangle$ | 9 | 9 | 7 |
| 27 | $C_2H_5O-\overset{O}{\underset{\|}{C}}-CH_2-\overset{O}{\underset{\|}{S}}-SCH_2-\langle\bigcirc\rangle$ | 9 | 8 | 3 |
| 28 | $(n)C_3H_7O-\overset{O}{\underset{\|}{C}}-CH_2-\overset{O}{\underset{\|}{S}}-S-C_2H_5$ | 9 | 9 | 0 |
| 29 | $CH_3-O-\overset{O}{\underset{\|}{C}}-\overset{CH_3}{\underset{\|}{CH}}-\overset{O}{\underset{\|}{S}}-S-C_2H_5$ | 9 | 8 | 0 |
| 30 | $C_2H_5O-\overset{O}{\underset{\|}{C}}-\overset{CH_3}{\underset{\|}{CH}}-\overset{O}{\underset{\|}{S}}-O-C_3H_7(i)$ | 9 | 8 | 3 |

TABLE 1 —Continued

| Example number | Active compound | Concentration (p.p.m.) 10,000 | 1,000 | 100 |
|---|---|---|---|---|
| 31 | $C_2H_5O-\overset{O}{\underset{\|}{C}}-\overset{CH_3}{\underset{\|}{CH}}-\overset{O}{\underset{\|}{S}}-O-C_2H_4-S\ S-\underset{\underset{CHCl_2}{\|}}{CHCl}$ | 9 | 9 | 0 |
| 32 | $(n)C_3H_7O-\overset{O}{\underset{\|}{C}}-\overset{CH_3}{\underset{\|}{CH}}-\overset{O}{\underset{\|}{S}}-S-C_2H_5$ | 9 | 9 | 1 |
| 33 | $(i)C_3H_7O-\overset{O}{\underset{\|}{C}}-\overset{CH_3}{\underset{\|}{CH}}-\overset{O}{\underset{\|}{S}}-O-C_2H_4S\ S-\underset{\underset{CHCl_2}{\|}}{CHCl}$ | 9 | 8 | (1) |
| 34 | $(n)C_4H_9O-\overset{O}{\underset{\|}{C}}-\overset{CH_3}{\underset{\|}{CH}}-\overset{O}{\underset{\|}{S}}-S-C_2H_5$ | 9 | 6 | (1) |
| 35 | $CH_3O-\overset{O}{\underset{\|}{C}}-\underset{\underset{CH_3}{\|}}{\overset{CH_3}{\underset{\|}{C}}}-S-\overset{O}{\underset{\|}{S}}-\langle O\rangle-Cl$ | 9 | 8 | 2 |
| 36 | $C_2H_5O-\overset{O}{\underset{\|}{C}}-\underset{\underset{CH_3}{\|}}{\overset{CH_3}{\underset{\|}{C}}}-\overset{O}{\underset{\|}{S}}-O-C_2H_4S\ S-\underset{\underset{CHCl_2}{\|}}{CHCl}$ | 9 | 8 | (2) |

EXAMPLE 2

Snap Bean Foliar Spray Test

Wettable powder base consisting of:
- 92 parts by weight hydrated silica (ultra fine, "Hi-Sil 233")
- 4 parts by weight sodium lignin sulfonate ("Marasperse N")
- 4 parts by weight polycondensate of ethylene oxide, propylene oxide and propylene glycol, (mol. wt. about 1,000) ("Pluronic L-61")

To produce a suitable preparation of the particular active compound, 1 part by weight of such active compound is mixed intimately with 1 part by weight of the stated wettable powder base, and the resulting mixture is diluted with water, containing 0.01 percent polyoxyethylene sorbitan monolaurate (Tween 20) as emulsifier, to the desired final concentration.

Snap bean plants, as soon as the primary leaves are relatively smooth (6–7 days old) and are capable of absorbing and translocating chemicals, are sprayed, (treated) with the given active compound preparation at the indicated concentration until just dew moist. For each test, 40 mls. of the appropriate compound dilution are sprayed on 4 plants in an area of 5 square feet.

The so-treated plants are moved to a greenhouse and remain there for 10 to 14 days. The degree of growth response is determined by measuring three parameters: total plant height, length of second node to apex, and petiol length of the first trifoliate leaves.

A "0" to "9" scale reading is used to express the degree of potential growth retardation. A "0" scale reading indicates growth retardation within the range of 0 percent to 10 percent compared with the control. A "9" scale reading corresponds to 90 percent or more growth retardation.

A (0) to (9) scale rating is used to indicate the activity of potential growth promotants. (0) indicates growth promotion within the range of 0–10 percent compared with the control, whereas (9) indicates 90 percent or greater growth promotion as compared with the control.

The particular active compounds tested, the amounts used and the results obtained can be seen from the following Table 2.

TABLE 2

| Example number | Active Compound | Concentration (p.p.m.) | | | | | | | | |
|---|---|---|---|---|---|---|---|---|---|---|
| | | 10,000 | | | 1,000 | | | 100 | | |
| | | a | b | c | a | b | c | a | b | c |
| 25 | $CH_3O-\overset{O}{\underset{\|}{C}}-CH_2-\overset{O}{\underset{\|}{S}}-S-\langle O\rangle-Cl$ | 1 | 4 | 0 | 0 | 0 | 0 | 0 | 0 | 0 |
| 26 | $C_2H_5O-\overset{O}{\underset{\|}{C}}-CH_2\overset{O}{\underset{\|}{S}}-S-\langle O\rangle$ | 1 | 3 | 4 | 1 | 0 | 0 | 0 | 0 | 0 |
| 27 | $C_2H_5O-\overset{O}{\underset{\|}{C}}-CH_2\overset{O}{\underset{\|}{S}}-S-CH_2-\langle O\rangle$ | 3 | 4 | 4 | 3 | 5 | 2 | 3 | 5 | 1 |
| 30 | $C_2H_5O-\overset{O}{\underset{\|}{C}}-\overset{CH_3}{\underset{\|}{CH}}-\overset{O}{\underset{\|}{S}}-O-C_3H_7(i)$ | 1 | 1 | 0 | 1 | 1 | 1 | 0 | 0 | 0 |
| 31 | $C_2H_5O-\overset{O}{\underset{\|}{C}}-\overset{CH_3}{\underset{\|}{CH}}-\overset{O}{\underset{\|}{S}}-O-C_2H_4-SS-\underset{\underset{CHCl_2}{\|}}{CHCl}$ | 3 | 4 | 0 | 1 | 2 | 2 | 4 | 5 | 2 |

TABLE 2 — Continued

| Example number | Active Compound | Concentration (p.p.m.) | | | | | | | | |
|---|---|---|---|---|---|---|---|---|---|---|
| | | 10,000 | | | 1,000 | | | 100 | | |
| | | a | b | c | a | b | c | a | b | c |
| 35 | $CH_3O-\overset{O}{\underset{\|}{C}}-\underset{CH_3}{\overset{CH_3}{\underset{\|}{C}}}-\overset{O}{\underset{\|}{S}}-S-\langle\bigcirc\rangle-Cl$ | 1 | 3 | 5 | 0 | 0 | 0 | 0 | 0 | 0 |
| 36 | $C_2H_5O-\overset{O}{\underset{\|}{C}}-\underset{CH_3}{\overset{CH_2}{\underset{\|}{C}}}-\overset{O}{\underset{\|}{S}}-O-C_2H_4SS-\underset{CHCl_2}{CHCl}$ | 1 | 3 | 2 | 0 | 0 | 0 | 0 | 0 | 0 |

In this table, the letters a, b and c refer respectively to total plant height, length of second node to apex, and petiol length of the first trifoliate leaves.

EXAMPLE 3

Agar Plate Fungicide Test (Mycelium growth)
Solvent: 99 parts by weight distilled water
Dispersing agent: parts by weight of polyoxyethylene sorbitan monolaurate ("Tween 20")

To produce a suitable preparation of the particular active compound, 1 part by weight of such active compound is mixed with the stated amount of solvent containing the stated amount of dispersing agent.

The active compound preparation is added to potato dextrose agar (which has been liquefied by heating) in such an amount that the desired concentration of active compound is provided therein. After thorough shaking to achieve a uniform dispersion of the active compound, the agar is poured into Petri dishes under sterile conditions. Control dishes to which the active compound preparation has not been added are also set up.

When the mixture of substrate and active compound has solidified, the dishes are inoculated in the center of the plate with the species of fungi stated in the Table and incubated at room temperature (21-25° C.) for 7 days.

After this time, the extent of mycelial growth is determined in relation to the growth of the untreated control by measuring the average radius of the fungal colony from the central point of inoculation to the periphery of mycelial growth. The inhibition of fungal growth is expressed by the values 0 to 10, where 0 means that there is no inhibition (full growth as in control) and 10 means that there is complete inhibition (absence of growth).

The particular active compounds tested, their concentrations in the agar used, the test fungi and the inhibition effects achieved can be seen from the following Table 3.

TABLE 3

| Example number | Active compound | Conc. in p.p.m. | Colleto- trichum obicu- lare | Fu- sarium lyco- persici | Fu- sarium nivale | Hel- minto- sporium sativum | Rhizoc- tonia solani | Verti- cillium albo- atrum | Pythium |
|---|---|---|---|---|---|---|---|---|---|
| 26 | $C_2H_5O-\overset{O}{\underset{\|}{C}}-CH_2\overset{O}{\underset{\|}{S}}-S-\langle\bigcirc\rangle$ | 500<br>100<br>10 | 10<br>5<br>2 | 10<br>8<br>5 | 8<br>5<br>2 | 10<br>5<br>2 | 8<br>5<br>2 | 10<br>5<br>2 | 8<br>5<br>2 |
| 27 | $C_2H_5O-\overset{O}{\underset{\|}{C}}-CH_2\overset{O}{\underset{\|}{S}}-S-CH_2-\langle\bigcirc\rangle$ | 500<br>100<br>10 | 2<br>0<br>0 | 2<br>0<br>0 | 2<br>0<br>0 | 5<br>2<br>2 | 0<br>0<br>0 | 5<br>0<br>0 | 5<br>2<br>0 |
| 28 | $(n)C_3H_7O-\overset{O}{\underset{\|}{C}}-CH_2\overset{O}{\underset{\|}{S}}-S-C_2H_5$ | 500<br>100<br>10 | 10<br>0<br>0 | 10<br>8<br>0 | 0<br>0<br>0 | ---- | 10<br>10<br>10 | ---- | 10<br>10<br>0 |
| 29 | $CH_3O-\overset{O}{\underset{\|}{C}}-\underset{}{\overset{CH_3}{\underset{\|}{CH}}}-\overset{O}{\underset{\|}{S}}-S-C_2H_5$ | 500<br>100<br>10 | 10<br>0<br>0 | 10<br>0<br>0 | 10<br>0<br>0 | ---- | 10<br>10<br>0 | ---- | 10<br>10<br>0 |
| 30 | $C_2H_5O-\overset{O}{\underset{\|}{C}}-\underset{}{\overset{CH_3}{\underset{\|}{CH}}}-\overset{O}{\underset{\|}{S}}-O-C_3H_7(i)$ | 500<br>100<br>10 | 10<br>5<br>0 | 10<br>10<br>0 | 10<br>10<br>0 | 10<br>10<br>0 | 10<br>5<br>0 | 10<br>10<br>10 | 10<br>10<br>8 |
| 31 | $C_2H_5O-\overset{O}{\underset{\|}{C}}-\underset{}{\overset{CH_3}{\underset{\|}{CH}}}-\overset{O}{\underset{\|}{S}}-O-C_2H_4-S-S-\underset{CHCl_2}{CHCl}$ | 500<br>100<br>10 | 10<br>10<br>0 | 10<br>10<br>10 | 10<br>10<br>10 | 10<br>10<br>10 | 10<br>10<br>10 | 10<br>10<br>10 | 10<br>10<br>10 |
| 32 | $(n)C_3H_7O-\overset{O}{\underset{\|}{C}}-\underset{}{\overset{CH_3}{\underset{\|}{CH}}}-\overset{O}{\underset{\|}{S}}-S-C_2H_5$ | 500<br>100<br>10 | 10<br>10<br>0 | 0<br>0<br>0 | ---- | 10<br>10<br>0 | 0<br>0<br>0 | 5<br>0<br>0 | 0<br>0<br>0 |
| 33 | $(i)C_3H_7O-\overset{O}{\underset{\|}{C}}-\underset{}{\overset{CH_3}{\underset{\|}{CH}}}-\overset{O}{\underset{\|}{S}}-O-C_2H_4SS-\underset{CHCl_2}{CHCl}$ | 500<br>100<br>10 | 10<br>8<br>0 | 10<br>10<br>5 | 10<br>10<br>0 | ---- | 10<br>10<br>0 | ---- | 10<br>0<br>0 |
| 34 | $(n)C_4H_9O-\overset{O}{\underset{\|}{C}}-\underset{}{\overset{CH_3}{\underset{\|}{CH}}}-\overset{O}{\underset{\|}{S}}-S-C_2H_5$ | 500<br>100<br>10 | 0<br>0<br>0 | 8<br>0<br>0 | 10<br>0<br>0 | ---- | 10<br>10<br>0 | ---- | 10<br>10<br>0 |
| 36 | $C_2H_5O-\overset{O}{\underset{\|}{C}}-\underset{CH_3}{\overset{CH_3}{\underset{\|}{C}}}-\overset{O}{\underset{\|}{S}}-O-C_2H_4SS-\underset{CHCl_2}{CHCl}$ | 500<br>100<br>10 | 10<br>10<br>8 | 10<br>10<br>0 | 10<br>10<br>0 | ---- | 10<br>10<br>10 | ---- | 10<br>8<br>8 |

EXAMPLE 4

Post-emergence test
 Solvent: 10 parts by weight acetone.

To produce a suitable preparation of the particular compound, 1 part by weight of such active compound is mixed with the stated amount of solvent and the resulting concentrate is diluted further with acetone to the desired final concentration.

Test plants which have a height of about 5–15 cm. are sprayed with the preparation of the given active compound until just dew moist. After 10 days, the degree of damage to the plants is determined and characterized by the values 0-10, which have the following meanings:

| | | | |
|---|---|---|---|
| 0 | no effect | 6 | 60% Kill |
| 1 | 10% Kill | 7 | 70% Kill |
| 2 | 20% Kill | 8 | 80% Kill |
| 3 | 30% Kill | 9 | 90% Kill |
| 4 | 40% Kill | 10 | All plants dead |
| 5 | 50% Kill | | |

The particular active compounds tested, the rates thereof applied, and the results obtained can be seen from the following Table 4:

The following further examples are set forth to illustrate, without limitation, the process for producing the active compounds according to the present invention.

EXAMPLE 5

$$CH_3OOC \cdot CH_2-S-S-CH_2COOCH_3 \quad (IIa)$$

Method A 2.3 gms. (0.1 mole) sodium were dissolved in 100 ml. ethanol in each of two flasks. One was saturated with hydrogen sulfide and the excess removed before adding the second sodium ethoxide solution to the formed sodium hydrosulfide solution. After standing overnight, 3.2 gms. (0.1 mole) powdered sulfur was added at 25° C. and, after stirring for two hours, this solution was added to 30.6 gms. (0.2 mole) methyl bromoacetate (slightly exothermic, NaBr precipitated). The ethanol was evaporated in high vacuum and the residue taken up in water, extracted with $CHCl_3$, dried over $MgSO_4$, filtered and vacuum stripped, giving 15 gms. dimethyl dithioglycolate (72 percent yield) as a red-brown liquid.

TABLE 4.—POST-EMERGENCE TEST

| Example number | Active compound | Rates[1] | Pig weed | Wild mustard | Morning glory | Japanese millet | Water grass | Wild oats |
|---|---|---|---|---|---|---|---|---|
| 25 | $CH_3O-\overset{O}{\overset{\|}{C}}-CH_2-\overset{O}{\overset{\|}{S}}-S-\langle \bigcirc \rangle-Cl$ | 8<br>2 | 9<br>7 | 9<br>7 | 10<br>8 | 6<br>6 | 5<br>5 | 4<br>1 |
| 26 | $C_2H_5O-\overset{O}{\overset{\|}{C}}-CH_2\overset{O}{\overset{\|}{S}}-S-\langle \bigcirc \rangle$ | 8<br>2 | 10<br>5 | 5<br>1 | 5<br>3 | 6<br>4 | 6<br>4 | 6<br>2 |
| 27 | $C_2H_5O-\overset{O}{\overset{\|}{C}}-CH_2\overset{O}{\overset{\|}{S}}-S-CH_2-\langle \bigcirc \rangle$ | 8<br>2 | 0<br>0 | 1<br>1 | 2<br>3 | 2<br>0 | 2<br>0 | 2<br>1 |
| 28 | $(n)C_3H_7O-\overset{O}{\overset{\|}{C}}-CH_2\overset{O}{\overset{\|}{S}}-S-C_2H_5$ | 8<br>2 | 0<br>0 | 2<br>0 | 5<br>0 | 3<br>0 | 3<br>0 | 0<br>0 |
| 29 | $CH_3O-\overset{O}{\overset{\|}{C}}-\overset{CH_3}{\overset{\|}{CH}}-\overset{O}{\overset{\|}{S}}-S-C_2H_5$ | 8<br>2 | 2<br>0 | 2<br>0 | 3<br>0 | 1<br>0 | 1<br>0 | 0<br>0 |
| 30 | $C_2H_5-O-\overset{O}{\overset{\|}{C}}-\overset{CH_3}{\overset{\|}{CH}}-\overset{O}{\overset{\|}{S}}-O-C_3H_7(i)$ | 8<br>2 | 0<br>0 | 0<br>0 | 5<br>4 | 1<br>0 | 1<br>0 | 0<br>0 |
| 31 | $C_2H_5O-\overset{O}{\overset{\|}{C}}-\overset{CH_3}{\overset{\|}{CH}}-\overset{O}{\overset{\|}{S}}-C_2H_4-S\;S-\overset{}{\underset{\overset{\|}{CHCl_2}}{CHCl}}$ | 8<br>2 | 9<br>5 | 6<br>4 | 7<br>6 | 3<br>2 | 3<br>2 | 0<br>1 |
| 32 | $(n)C_3H_7O-\overset{O}{\overset{\|}{C}}-\overset{CH_3}{\overset{\|}{CH}}-\overset{O}{\overset{\|}{S}}-S-C_2H_5$ | 8<br>2 | 0<br>0 | 0<br>0 | 3<br>0 | 0<br>0 | 1<br>0 | 0<br>0 |
| 33 | $(i)C_3H_7O-\overset{O}{\overset{\|}{C}}-\overset{CH_3}{\overset{\|}{CH}}-\overset{O}{\overset{\|}{S}}-O-C_2H_4\;S\;S-\underset{\overset{\|}{CHCl_2}}{CHCl}$ | 8<br>2 | 9<br>6 | 9<br>7 | 10<br>9 | 6<br>4 | 6<br>4 | 5<br>1 |
| 34 | $(n)C_4H_9O-\overset{O}{\overset{\|}{C}}-\overset{CH_3}{\overset{\|}{CH}}-\overset{O}{\overset{\|}{S}}-S-C_2H_5$ | 8<br>2 | 4<br>0 | 5<br>1 | 6<br>3 | 2<br>0 | 2<br>0 | 0<br>0 |
| 35 | $CH_3O-\overset{O}{\overset{\|}{C}}-\underset{\overset{\|}{CH_3}}{\overset{CH_3}{\overset{\|}{C}}}-\overset{O}{\overset{\|}{S}}-S-\langle \bigcirc \rangle-Cl$ | 8<br>2 | 9<br>4 | 5<br>4 | 9<br>6 | 7<br>3 | 6<br>3 | 4<br>1 |
| 36 | $C_2H_5O-\overset{O}{\overset{\|}{C}}-\underset{\overset{\|}{CH_3}}{\overset{CH_3}{\overset{\|}{C}}}-\overset{O}{\overset{\|}{S}}-O-C_2H_4\;S\;S-\underset{\overset{\|}{CHCl_2}}{CHCl}$ | 8<br>2 | 8<br>6 | 7<br>5 | 9<br>6 | 4<br>3 | 4<br>4 | 3<br>0 |

[1] Of active compound applied in lbs./acre.

EXAMPLE 6

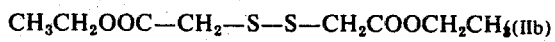

Method $B_2$ 145 gms. (0.66 mole) dithiodiglycolyl chloride were reacted with 77 GMS. gms. 1.67 mole) ethanol which was slowly added dropwise with cooling. HCl evolution was vigorous and the mixture was stirred overnight and refluxed for 3 hours. Removing the HCl and ethanol in vacuum gave 156.4 gms. (99.5 percent yield) of diethyl dithioglycolate as a dark oil,
$b_{.05}$ 105° C., $n_D^{25}$ 1.4961, percent C calc. 40.4, fd. 40.3.

EXAMPLE 7

Method $B_1$ 50 gms. (0.274 mole) dithiodiglycolic acid were mixed with (1.64 mole) n-propanol and a catalytic amount of p-toluenesulfonic acid was added. The formed water was azeotroped through a "Soxhlet" extraction apparatus charged with "Linde, Type 3A" molecular sieves (completed in 90 minutes). After $CHCl_3$ was added, the solution was washed with $H_2O$, dried over $MgSO_4$, filtered and vacuum stripped, giving 65 gms. (83 percent yield) of di-n-propyl dithioglycolate.

EXAMPLE 8

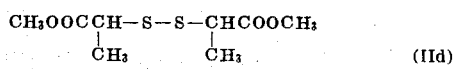

Method $B_1$ 35 gms. (0.167 mole) di-thiolactic acid and (0.67 mole) methanol were mixed and a catalytic amount of p-toluenesulfonic acid was added. The water formed was removed azeotropically through a "Soxhlet" extractor containing molecular sieves as described in Example 7. Washing with $H_2O$, extracting into $CHCl_3$, drying over $MgSO_4$, filtering and stripping in vacuum gave 28.7 gms. (73 percent yield)dimethyl dithiolactate as a clear, colorless liquid.

EXAMPLE 9

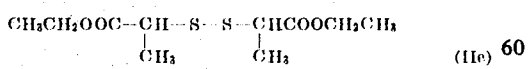

Method $B_2$ 33 gms. (0.715 mole) ethanol were added dropwise to 62.7 gms. (0.286 mole) dithiodilactoyl chloride with cooling (strongly exothermic). After completed addition of the ethanol and refluxing until no more HCl evolved, the mixture was allowed to stand overnight. Diluting with benzene, washing with $H_2O$, drying over $MgSO_4$, filtration and vacuum stripping gave 60 gms. (89 percent yield) of diethyl dithiolactate, $b_{.015}$ 100° C.; $n_D^{24}$ 1.4875.

EXAMPLE 10

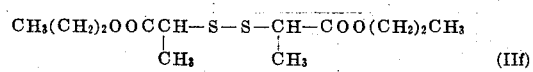

Method $B_1$ 60 gms. (1 mole) n-propanol and 35 gms. (0.167 mole) dithiodilactic acid were mixed along with a catalytic amount of p-toluenesulfonic acid. The formed water was removed azeotropically through a "Soxhlet" extractor containing molecular sieves as described in Example 7 above. After completed reaction, the crude mixture was taken up in $CHCl_3$—$H_2O$ and the organic layer was dried over $MgSO_4$, filtered and stripped, giving 42 gms. (86 percent yield) of di-n-propyl dithiolactate as a yellow oil.

EXAMPLE 11

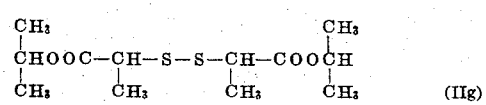

Method A 32.4 gms. (0.135 mole) sodium sulfide monohydrate were dissolved in 150 ml. hot ethanol and 4.4 gms. (0.135 mole) powdered sulfur were added giving a brown solution which was added dropwise to 35 gms. (0.18 mole) isopropyl-2-bromopropionate dissolved in 50 ml. ethanol at a rate so that the sodium disulfide decolorized rapidly. After standing overnight and stripping the ethanol, $CHCl_3$—$H_2O$ was added and the organic layer dried over $M_gSO_4$; filtration and stripping in vacuum gave 24.6 gms. (63 percent yield) of diisopropyl dithiolactate.

EXAMPLE 12

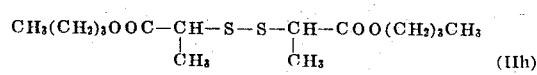

Method A 30 gms. (0.145 mole) sodium sulfide monohydrate was dissolved in 150 ml. hot ethanol and 4.6 gms. (0.145 mole) powdered sulfur was added in portions giving a red-brown solution which was added dropwise to 42 gms. (0.2 mole) n-butyl-2-bromopropionate dissolved in 100 ml. ethanol (the sodium sulfide decolorized and NaBr precipitated). Dilute HCl was added to neutralize the reaction, the ethanol was stripped, and CHCl$_3$—H$_2$O was added to the crude residue. The organic layer was dried over MgSO$_4$, filtered and stripped giving 34 gms. (70 percent yield) di-n-butyl dithiolactate as a yellow oil.

EXAMPLE 13

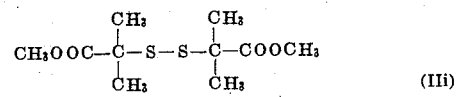
(IIi)

Method B$_1$ 12.3 gms. (0.052 mole) 2-carboxypropyl-2-disulfide were mixed with 150 ml. methanol and a catalytic amount of p-toluenesulfonic acid was added. The formed water was removed azeotropically through a "Soxlet" extractor containing molecular sieves as described in Example 7. After refluxing overnight, stripping free of methanol, adding CHCl$_3$—H$_2$O, drying the organic layer over MgSO$_4$, filtering and vacuum stripping, 7.3 gms. (53 percent yield) bis-2-carbomethoxy propyl disulfide was obtained as a yellow oil.

EXAMPLE 14

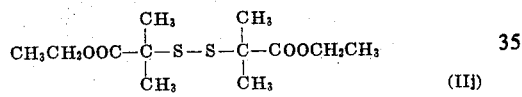
(IIj)

Method B$_2$ 15 gms. (0.0545 mole) 2-chlorocarbonyl propyl-2-disulfide were reacted with 100 ml. ethanol which was added dropwise with stirring and cooling. After standing for 48 hours, refluxing for six hours and stripping, 14 gms. (87 percent yield) of bis-2-carbethoxy propyl-2-disulfide were obtained as a dark liquid; n$_D^{24}$ 1.4919; % S calc. 21.8, fd. 21.65.

EXAMPLE 15

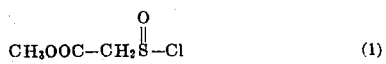
(1)

11.2 gms. (0.0534 mole) of bis-dimethyldithioglycolate were diluted with 10.9 gms. (0.107 mole) of acetic anhydride and cooled to between −20° and −30° C. (dry ice-acetone). 11.3 gms. (0.16 mole) of dry chlorine gas were then introduced with slow stirring and continued cooling at a moderate rate, keeping the reaction temperature below −20° C. Allowing the mixture to attain room temperature over a 2- to 4-hour period, standing overnight, followed by a 30-minute warming period at approximately 50° C. completed the reaction. Removal of the formed acetyl chloride in high vacuum furnished 12.6 gms. (76 percent yield) of carbomethoxy methane sulfinyl chloride as a bright yellow oil which was essentially pure, b.$_{22}$ 71° C., n$_D^{20}$ 1.4830.

EXAMPLE 16

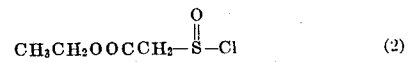
(2)

47.5 gms. (0.2 mole) of diethyldithioglycolate were diluted with 41 gms. (0.4 mole) of acetic anhydride and cooled to −30° C. as 42.5 gms. (0.6 mole) of gaseous chlorine were introduced, keeping the temperature below −28° C. with a dry ice-acetone bath. The mixture was allowed to attain room temperature overnight. It was warmed to 40° for 30 minutes to complete the reaction and stripped of volatiles in vacuum giving 68 gms. (99.6 percent yield) of carbethoxy methane sulfinyl chloride as a yellow liquid, b.$_{16}$ 75° C., n$_D^{30}$ 1.4800.

EXAMPLE 17

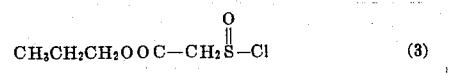
(3)

28.6 gms. (0.1 mole) of dipropyl dithioglycolate and 20.4 gms. (0.2 mole) of acetic anhydride were mixed and cooled to −30° C. with a dry ice-acetone bath as 21.3 gms. (0.3 mole) of gaseous chlorine were introduced, keeping the temperature between −30° C. and −20° C. Standing overnight and warming to 50° C. for 30 minutes before stripping off the acetyl chloride in vacuum gave 38 gms. (98 percent yield) of carbopropoxy methane sulfinyl chloride as a yellow liquid, b.$_{22}$ 79° C. n$_D^{24}$ 1.4804.

EXAMPLE 18

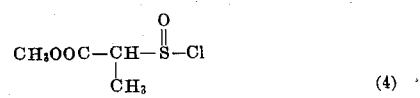
(4)

23.8 gms. (0.1 mole) of dimethyl dithiolactate were diluted with 20.4 gms. (0.2 mole) of acetic anhydride and cooled to −30° C. as 21.3 gms. (0.3 mole) of chlorine gas were introduced, keeping the temperature below −20° C. with a dry ice-acetone bath. Standing overnight and warming to 50° C. for 30 minutes before stripping in vacuum gave 35 gms. (100 percent yield) of 1-carbomethoxy-1-ethane sulfinyl chloride as a yellow liquid, b.$_{11}$ 46° C., n$_D^{25}$ 1.4949.

EXAMPLE 19

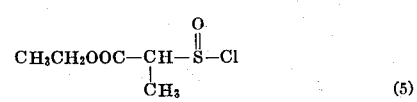
(5)

48 gms. (0.2 mole) of diethyldithiolactate were mixed with 41 gms. (0.4 mole) of acetic anhydride and cooled to 30° C. 42.5 gms. (0.6 mole) of chlorine gas were introduced maintaining the temperature below −20° C. with a dry-ice-acetone bath. Standing overnight and warming to 50° C. for 30 minutes completed the reaction. The mixture was then stripped in vacuum giving a light yellow liquid which was distilled, b.₄₅ 62° C., n$_D^{25}$ 1.4830; 56.7 gms. (77 percent yield) of 1-carbethoxy-1-ethane sulfinyl chloride were obtained.

EXAMPLE 20

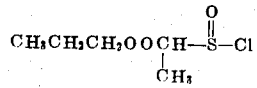

(6)

29.4 gms (0.1 mole) of dipropyl dithiolactate were diluted with 20.4 gms. (0.2 mole) of acetic anhydride. The mixture was cooled to −30° C. with a dry ice-acetone bath as 21.3 gms. (0.3 mole) of chlorine gas were introduced, keeping the temperature below −20° C. Standing for 48 hours and removing all volatiles in vacuum gave 32.9 gms. (95.5 percent yield) of 1-carbopropoxy-1-ethane sulfinyl chloride as a yellow oil, n$_D^{23}$ 1.4804.

EXAMPLE 21

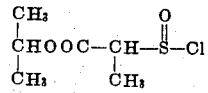

(7)

29.2 gms. (0.1 mole) of diisopropyl dithiolactate and 20.4 gms. (0.2 mole) of acetic anhydride were mixed and cooled to −30° C. (dry ice-acetone). 21.3 gms. (0.3 mole) of chlorine gas were introduced at −20° C. to −30° C. and the resulting solution was allowed to attain room temperature on standing overnight. Removing the acetyl chloride in vacuum gave 23 gms. (60 percent yield) of 1-carboisopropoxy-1-ethane sulfinyl chloride as a yellow liquid, b.₀₁₅ 42° C., n$_D^{24}$ 1.4742.

EXAMPLE 22

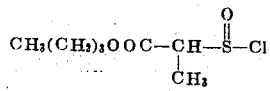

(8)

33.2 gms. (0.1 mole) of dibutyl dithiolactate were diluted with 20.4 gms. (0.2 mole) of acetic anhydride and cooled to −30°C. with a dry ice-acetone batch as 21.3 gms. (0.3 mole) of gaseous chlorine were introduced, keeping the temperature at below −20° C. After completed chlorine introduction, the mixture was allowed to attain room temperature on standing overnight before warming for 30 minutes at 50° C. and removing all volatiles in vacuum. 43 gms. (99 percent yield) of 1-carbobutoxy-1-ethane sulfinyl chloride were obtained as a yellow liquid, b.₁₅ 72° C., n$_D^{25}$ 1.4786.

EXAMPLE 23

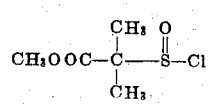

(9)

7.3 gms. (0.0275 mole) of bis 2-carbomethoxy propane-2-disulfide were mixed with 5.1 gms. (0.05 mole) of acetic anhydride. A dry ice-acetone bath was used to keep the temperature between −20° C. and −30° C. as 5.8 gms. (0.0825 mole) of gaseous chlorine were introduced. The mixture was allowed to attain room temperature on standing overnight. Stripping in vacuum gave 7.4 gms. (80 percent yield) of 2-carbomethoxy-2-propane sulfinyl chloride as an almost colorless liquid, b.₀₈ 50° C., n$_D^{26}$ 1.4827.

EXAMPLE 24

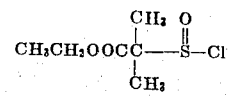

(10)

29.1 gms. (0.1 mole) of 2-carbethoxy propyl-2-disulfide were diluted with 20.4 gms. (0.2 mole) of acetic anhydride and cooled to −30° C. (dry ice-acetone). 21.3 gms. (0.3 mole) of chlorine gas were introduced at −20° C. to −30° C. and the resulting mixture allowed to attain room temperature overnight. Removing of all volatiles in vacuum gave 29.6 gms. (75 percent yield) of 2-carbethoxy-2-propane sulfinyl chloride as an almost colorless liquid, b.₂₆ 61° C., n$_{D28}$ 1.4704.

EXAMPLE 25

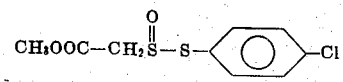

15.7 gms. (0.1 mole) of carbomethoxy methane sulfinyl chloride were added dropwise to 14.5 gms. (0.1 mole) of p-chlorothiophenol diluted with 100 ml. of CHCl₃. After refluxing for 6 hours, the reaction mixture was stripped of solvent in vacuum giving 26.1 gms. (98.5 percent yield) of p-chlorophenyl carbomethoxy methane thiosulfinate as a yellow solid, M.P. 52° C. to 54° C.

EXAMPLE 26

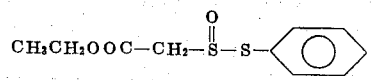

8.3 gms. (0.049 mole) of carbethoxy methane sulfinyl chloride were added dropwise to 5.4 gms. (0.049 mole) of thiophenol which was dissolved in 40 ml. CHCl₃. After standing overnight and refluxing for 4 hours, the mixture was washed with H₂O, dried over MgSO₄, filtered and stripped in vacuum, giving 8.1 gms. (67 percent yield) of phenyl carbethoxy methane thiosulfinate as an amber liquid, n$_{D30}$ 1.5836; percent S calc. 26.2, percent S fd. 26.3.

EXAMPLE 27

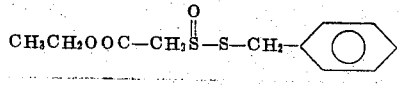

7.8 gms. (0.0465 mole) of carbethoxy methane sulfinyl chloride were diluted with 40 ml. of CHCl₃ and cooled to 0° C. as 5.8 gms. (0.0465 mole) of benzyl mercaptan were added dropwise with stirring. After adding 4.7 gms. (0.0465 mole) of triethylamine slowly at 0° C., the mixture was stirred for 3 hours at room temperature followed by warming to 50° C. for 1 hour. Washing with $H_2O$, dilute HCl, drying over $MgSO_4$, filtering and vacuum stripping gave 9 gms. (75 percent yield) of benzyl carbethoxy methane thiosulfinate as a red liquid, percent S calc. 24.8, percent S fd. 25.1.

EXAMPLE 28

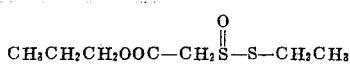

13.6 gms. (0.07 mole) of carbopropoxy methane sulfinyl chloride were diluted with 100 ml. of $CHCl_3$ and 5 gms. (0.08 mole) of ethyl mercaptan dissolved in 20 ml. of $CHCl_3$ were added dropwise with stirring. After stirring overnight at 25° C., the mixture was heated at 50° C. for 1 hour before drying over $MgSO_4$, filtering and stripping in vacuum, giving 13 gms. (84.5 percent yield) of ethyl carbopropoxy methane thiosulfinate as a yellow liquid, percent S calc. 29.1, percent S fd. 30.6.

EXAMPLE 29

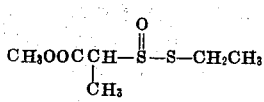

11.9 gms. (0.07 mole) of 1-carbomethoxy-1-ethane sulfinyl chloride were diluted in 100 ml. of $CHCl_3$ and 5 gms. (0.08 mole) of ethyl mercaptan were added dropwise. After stirring overnight at 25° C., refluxing for 2 hours and stripping in vacuum, 12.9 gms (94 percent yield) of ethyl 1-carbomethoxy ethane-1-thiosulfinate were obtained as amber liquid.

EXAMPLE 30

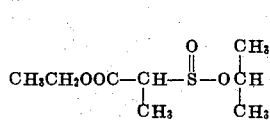

11.1 gms. (0.06 mole) of 1-carbethoxy-1-ethane sulfinyl chloride were diluted with 40 ml. of benzene and 3.6 gms. (0.06 mole) of isopropyl alcohol were added dropwise with stirring. Heating at 50° C. for 4 hours, followed by vacuum stripping gave 8.6 gms. (69 percent yield) of isopropyl 1-carbethoxy ethane-1-sulfinate as yellow liquid, $n_D^{22}$ 1.4612.

EXAMPLE 31

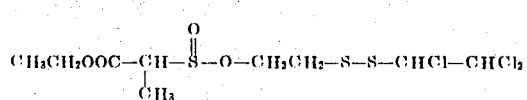

9.2 gms. (0.05 mole) of 1-carbethoxy-1-ethane sulfinyl chloride were added to 12 gms. (0.05 mole) of 1,2,2-trichloroethyl-β-hydroxyethyl disulfide with stirring. After standing for 48 hours and warming for 1 hour at 50° C., all volatiles were stripped in vacuum giving 17.8 gms. (92 percent yield) of 1,2,2-trichloroethyl-dithioethyl 1-carbethoxy ethane-1-sulfinate as amber liquid, $n_D^{23}$ 1,5410. percent S calc. 27.8, percent S fd. 26.3.

EXAMPLE 32

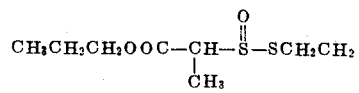

20 ml. of ethyl mercaptan were added to 9.9 gms. (0.05 mole) of 1-carbopropoxy-1-ethane sulfinyl chloride. After standing overnight and heating at 50° C. for 1 hour, the mixture was vacuum stripped giving 10.1 gms. (91 percent yield) of ethyl-1-carbopropoxy ethane-1-thiosulfinate as amber liquid.

EXAMPLE 33

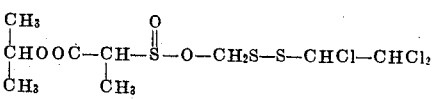

7.9 gms. (0.04 mole) of 1-carbosiopropoxy-1-ethane sulfinyl chloride were diluted in 100 ml. $CHCl_3$ and 9.6 gms. (0.04 mole) of 1,2,2-trichloroethyl-β-hydroxy ethyl disulfide was dropped in. After standing for 2 weeks at 25° C. and vacuum stripping, 15.3 gms. (95 percent yield) of 1,2,2-trichloroethyl-dithioethyl 1-carboisopropoxy ethane-1-sulfinate was obtained as a clear, colorless liquid, $n_D^{17}$ 1.5426.

EXAMPLE 34

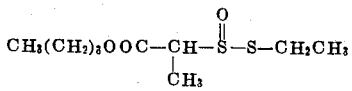

13 gms. (0.06 mole) of 1-carbobutoxy-1-ethane sulfinyl chloride were diluted with commercial $CHCl_3$ and 20 ml. ethyl mercaptan were added dropwise. After standing overnight and heating slightly (40° C.) for 1 hour, the mixture was dried over $MgSO_4$, filtered and stripped in vacuum, giving 13.3 gms. (92 percent yield) of ethyl 1-carbobutoxy ethane-1-thiosulfinate as a yellow liquid, percent S calc. 26.3, percent S fd. 26.8.

EXAMPLE 35

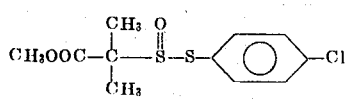

5.8 gms. (0.04 mole) of p-chlorothiophenol were diluted with 50 ml. of $CHCl_3$ and 7.4 gms. (0.04 mole) of 2-carbomethoxy-2-propane sulfinyl chloride were added dropwise with stirring. After standing overnight and refluxing for 1 hour, the mixture was vacuum stripped, giving 11.4 gms. of p-chlorophenyl-2-carbomethoxy propane thiosulfinate as a yellow solid.

EXAMPLE 36

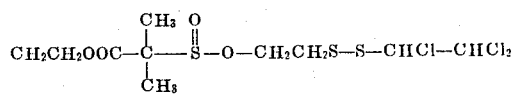

8 gms. (0.04 mole) of 2-carbethoxy-2-propane sulfinyl chloride were diluted with 100 ml. of $CHCl_3$ and 9.6 gms. (0.04 mole) of 1,2,2-trichloroethyl-β-hydroxyethyl disulfide was added dropwise with stirring. After standing at 25° C. for 2 weeks and vacuum stripping, 16 gms. (99 percent yield) of 1,2,2-trichloroethyl dithioethyl-2-carbethoxy propane-2-sulfinate was obtained as a clear, colorless liquid, $n_D^{18}$ 1.5271.

It will be realized by the artisan that all of the foregoing compounds contemplated by the present invention possess the desired strong pesticidal, especially growth regulatory, herbicidal and fungicidal properties for combatting undesirable growth, weeds and fungi, with regard to a broad spectrum of activity, as well as a comparatively low toxicity toward warm-blooded creatures and higher plants for more effective control and/or elimination of undesirable plant growth, weeds and fungi by application of such compounds to such plants, weeds and fungi and/or their corresponding habitat.

It will be appreciated that the instant specification and examples are set forth by way of illustration and not limitation, and that various modifications and changes may be made without departing from the spirit and scope of the present invention.

What is claimed is:

1. A carbalkoxyalkane sulfinic acid derivative of the formula $$RO-\overset{O}{\underset{\|}{C}}-\overset{R'}{\underset{R''}{C}}-\overset{O}{\underset{\|}{S}}-X$$

in which
R is lower alkyl,
R' and R'' are each lower alkyl or hydrogen, and
X is chlorine or bromine.

2. A carbalkoxyalkane sulfinic acid derivatives according to claim 1 in which
R is methyl or ethyl, and
R' and R'' are each individually methyl or hydrogen.

3. A compound according to claim 1 wherein such compound is methoxycarbonyl methane sulfinyl chloride of the formula

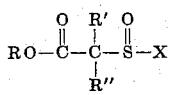 (1)

4. A compound according to claim 2 wherein such compound is ethoxycarbonyl methane sulfinyl chloride of the formula

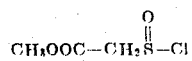 (2)

5. A compound according to claim 1 wherein each compound is 1-ethoxycarbonyl ethane-1-sulfinyl chloride of the formula

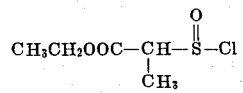 (5)

6. A compound according to claim 1 wherein such compound is 1-propoxycarbonyl ethane-1-sulfinyl chloride of the formula

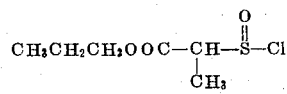

7. A compound according to claim 1 wherein such compound is 2-methoxycarbonyl propane-2-sulfinyl chloride of the formula

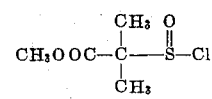 (9)

8. A compound according to claim 1 wherein such compound is 2-ethoxycarbonyl propane-2-sulfinyl chloride of the formula

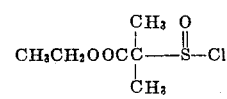 (10)

9. A compound according to claim 1 wherein such compound is n-propoxycarbonyl methane sulfinyl chloride of the formula

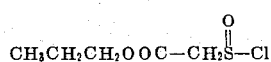 (3)

10. A compound according to claim 1 wherein such compound is 1-methoxycarbonyl ethane-1-sulfinyl chloride of the formula

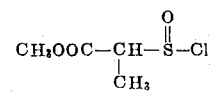 (4)

11. A compound according to claim 1 wherein such compound is 1-isopropoxycarbonyl ethane-1-sulfinyl chloride of the formula

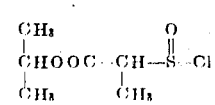 (7)

12. A compound according to claim 1 wherein such compound is 1-n-butoxycarbonyl ethane-1-sulfinyl chloride of the formula

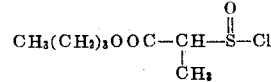 (8)

* * * * *